(12) United States Patent
Helmsderfer et al.

(10) Patent No.: US 9,597,699 B2
(45) Date of Patent: Mar. 21, 2017

(54) WATER FLOW METERING DEVICE

(75) Inventors: John Helmsderfer, Cincinnatti, OH (US); Andrew Ahr, Cincinnatti, OH (US)

(73) Assignee: Partners In Innovation Limited, LLC, Cincinnati, OH (US)

(*) Notice: Subject to any disclaimer, the term of this patent is extended or adjusted under 35 U.S.C. 154(b) by 821 days.

(21) Appl. No.: 13/411,119

(22) Filed: Mar. 2, 2012

(65) Prior Publication Data

US 2012/0223153 A1     Sep. 6, 2012

Related U.S. Application Data

(60) Provisional application No. 61/449,362, filed on Mar. 4, 2011.

(51) Int. Cl.
| | | |
|---|---|---|
| *B05B 12/00* | (2006.01) | |
| *B05B 12/02* | (2006.01) | |

(Continued)

(52) U.S. Cl.
CPC ............ *B05B 12/006* (2013.01); *A01G 25/16* (2013.01); *B05B 1/169* (2013.01); *B05B 1/1654* (2013.01); *B05B 12/004* (2013.01); *B05B 12/008* (2013.01); *B05B 12/02* (2013.01); *B05B 12/12* (2013.01); *B05B 1/18* (2013.01); *B05B 3/044* (2013.01); *B05B 3/0431* (2013.01); *B05B 3/0477* (2013.01); *B05B 3/0481* (2013.01);

(Continued)

(58) Field of Classification Search
CPC ..... B05B 12/004; B05B 12/006; B05B 12/02; A01G 25/16; A01G 25/165; A01G 25/167

See application file for complete search history.

(56) References Cited

U.S. PATENT DOCUMENTS

| | | |
|---|---|---|
| 924,519 A | 6/1909 | Wooding |
| 1,007,657 A | 10/1911 | Freund |

(Continued)

FOREIGN PATENT DOCUMENTS

| | | |
|---|---|---|
| EP | 0826427 A2 | 3/1998 |
| WO | 2011075660 A1 | 6/2011 |

OTHER PUBLICATIONS

Eighteen-page International Search Report and Written Opinion mailed Feb. 14, 2011 for PCT/US2010/061063.

*Primary Examiner* — Ryan Reis
(74) *Attorney, Agent, or Firm* — Wood Herron & Evans LLP

(57) ABSTRACT

A water flow metering device for use as a handheld or ground-based sprinkler includes a device body having a water inlet, a water distribution head in fluid communication with the device body, and a flow pattern selector. The flow pattern selector is coupled to the water distribution head and meters the amount of water sprayed onto the surrounding area. The flow pattern selector includes indicia that provide flow rate information to an operator. A pressure control valve regulates the flow rate in accordance with the information provided by the flow pattern selector. The water flow metering device may also include a timing mechanism having a timer which closes the water supply after a set period of time. A pressure transducer or other flow rate measuring device may allow the timer to operate the device for a predetermined amount of water distribution in inches per hour.

13 Claims, 15 Drawing Sheets

(51) Int. Cl.
  *A01G 25/16* (2006.01)
  *B05B 1/16* (2006.01)
  *B05B 12/12* (2006.01)
  B05B 1/18 (2006.01)
  B05B 3/04 (2006.01)
  B05B 3/06 (2006.01)
  B05B 9/01 (2006.01)
  B05B 15/06 (2006.01)

(52) U.S. Cl.
  CPC . *B05B 3/06* (2013.01); *B05B 9/01* (2013.01); *B05B 15/062* (2013.01); *B05B 15/063* (2013.01); *Y10T 137/86389* (2015.04)

(56) References Cited

U.S. PATENT DOCUMENTS

| | | |
|---|---|---|
| 1,026,742 A | 5/1912 | French |
| 1,031,176 A | 7/1912 | Gilpin |
| 1,058,189 A | 4/1913 | Moboyle |
| 1,078,817 A | 11/1913 | Austin |
| 1,168,219 A | 1/1916 | Miller |
| 1,566,232 A | 12/1925 | Schreiter |
| 1,612,326 A | 12/1926 | Taylor |
| 2,053,931 A | 9/1936 | Work |
| 2,620,232 A | 12/1952 | King |
| 2,770,826 A | 11/1956 | Curfman |
| 3,115,305 A | 12/1963 | Rinkcwich |
| 3,332,624 A | 7/1967 | Rinkcwich |
| 3,354,730 A | 11/1967 | Thompson |
| 3,630,450 A | 12/1971 | Stephany et al. |
| 3,941,109 A | 3/1976 | Schmid |
| 4,130,135 A | 12/1978 | Moore |
| 4,347,981 A | 9/1982 | Hayes |
| 4,421,276 A | 12/1983 | Rodgers |
| 4,708,291 A | 11/1987 | Grundy |
| 4,903,897 A | 2/1990 | Hayes |
| 5,160,093 A | 11/1992 | Battaglia |
| 5,174,501 A | 12/1992 | Hadar |
| 5,305,956 A | 4/1994 | Wang |
| 5,337,957 A * | 8/1994 | Olson ............... 239/63 |
| 5,947,388 A | 9/1999 | Woodruff |
| 6,123,272 A | 9/2000 | Havican et al. |
| 6,398,185 B1 | 6/2002 | Wang |
| 6,491,062 B1 * | 12/2002 | Croft ............... 137/624.11 |
| 6,554,209 B2 | 4/2003 | Djordjevic |
| 6,619,570 B1 | 9/2003 | Ericksen et al. |
| 6,663,022 B1 | 12/2003 | Baker |
| 6,708,722 B1 * | 3/2004 | Goodenough ......... 137/487.5 |
| 6,712,294 B1 | 3/2004 | Wang |
| 7,028,984 B2 | 4/2006 | Wang |
| 7,140,561 B2 | 11/2006 | Heren et al. |
| D536,062 S | 1/2007 | Hester |
| 7,252,246 B2 | 8/2007 | Heren et al. |
| 7,779,852 B2 * | 8/2010 | Burlage et al. ............ 137/1 |
| 7,866,333 B2 * | 1/2011 | Boe et al. ............ 137/1 |
| 2004/0222320 A1 | 11/2004 | Wu |
| 2006/0214023 A1 | 9/2006 | Collins et al. |
| 2008/0111001 A1* | 5/2008 | Elmer et al. ............ 239/11 |
| 2009/0293189 A1* | 12/2009 | Somerville ............ 4/597 |
| 2012/0036091 A * | 2/2012 | Cook ............ 705/412 |
| 2012/0126027 A1 | 5/2012 | Helmsderfer et al. |
| 2012/0223153 A1 | 9/2012 | Helmsderfer et al. |
| 2013/0037624 A1 | 2/2013 | Helmsderfer et al. |

* cited by examiner

| Time table for Spray Pattern A (in minutes) | | | | | | Time table for Spray Pattern B (in minutes) | | | | | |
|---|---|---|---|---|---|---|---|---|---|---|---|
| | Inches of water | | | | | | Inches of water | | | | |
| PSI | 0.25" | 0.5" | 1" | 2" | 3" | PSI | 0.25" | 0.5" | 1" | 2" | 3" |
| 40 | 12.04 | 24.08 | 48.15 | 96.31 | 144.46 | 40 | 23.25 | 46.51 | 93.02 | 186.03 | 279.05 |
| 41 | 12.49 | 24.98 | 49.97 | 99.94 | 149.91 | 41 | 24.13 | 48.26 | 96.53 | 193.05 | 289.58 |
| 42 | 12.95 | 25.90 | 51.81 | 103.62 | 155.43 | 42 | 25.02 | 50.04 | 100.08 | 200.16 | 300.24 |
| 43 | 13.42 | 26.84 | 53.67 | 107.34 | 161.01 | 43 | 25.92 | 51.84 | 103.68 | 207.35 | 311.03 |
| 44 | 13.89 | 27.78 | 55.55 | 111.11 | 166.66 | 44 | 26.83 | 53.66 | 107.31 | 214.63 | 321.94 |
| 45 | 14.36 | 28.73 | 57.46 | 114.92 | 172.37 | 45 | 27.75 | 55.50 | 110.99 | 221.98 | 332.98 |
| 46 | 14.85 | 29.69 | 59.38 | 118.77 | 178.15 | 46 | 28.68 | 57.36 | 114.71 | 229.42 | 344.14 |
| 47 | 15.33 | 30.67 | 61.33 | 122.66 | 183.99 | 47 | 29.62 | 59.24 | 118.47 | 236.95 | 355.42 |
| 48 | 15.82 | 31.65 | 63.30 | 126.60 | 189.90 | 48 | 30.57 | 61.14 | 122.27 | 244.55 | 366.82 |
| 49 | 16.32 | 32.64 | 65.29 | 130.57 | 195.86 | 49 | 31.53 | 63.06 | 126.11 | 252.23 | 378.34 |
| 50 | 16.82 | 33.65 | 67.30 | 134.59 | 201.89 | 50 | 32.50 | 65.00 | 130.00 | 259.99 | 389.99 |
| 51 | 17.33 | 34.66 | 69.32 | 138.65 | 207.97 | 51 | 33.48 | 66.96 | 133.91 | 267.83 | 401.74 |
| 52 | 17.84 | 35.69 | 71.37 | 142.75 | 214.12 | 52 | 34.47 | 68.94 | 137.87 | 275.74 | 413.62 |
| 53 | 18.36 | 36.72 | 73.44 | 146.88 | 220.33 | 53 | 35.47 | 70.93 | 141.87 | 283.74 | 425.61 |
| 54 | 18.88 | 37.77 | 75.53 | 151.06 | 226.59 | 54 | 36.46 | 72.95 | 145.90 | 291.81 | 437.71 |
| 55 | 19.41 | 38.82 | 77.64 | 155.28 | 232.91 | 55 | 37.49 | 74.99 | 149.97 | 299.95 | 449.92 |
| 56 | 19.94 | 39.88 | 79.77 | 159.53 | 239.30 | 56 | 38.52 | 77.04 | 154.08 | 308.17 | 462.25 |
| 57 | 20.48 | 40.96 | 81.91 | 163.82 | 245.73 | 57 | 39.56 | 79.11 | 158.23 | 316.46 | 474.69 |
| 58 | 21.02 | 42.04 | 84.08 | 168.15 | 252.23 | 58 | 40.60 | 81.21 | 162.41 | 324.82 | 487.23 |
| 59 | 21.57 | 43.13 | 86.26 | 172.52 | 258.78 | 59 | 41.66 | 83.31 | 166.63 | 333.26 | 499.89 |
| 60 | 22.12 | 44.23 | 88.46 | 176.92 | 265.39 | 60 | 42.72 | 85.44 | 170.88 | 341.77 | 512.65 |
| 61 | 22.67 | 45.34 | 90.68 | 181.37 | 272.05 | 61 | 43.79 | 87.59 | 175.17 | 350.35 | 525.52 |
| 62 | 23.23 | 46.46 | 92.92 | 185.84 | 278.77 | 62 | 44.87 | 89.75 | 179.50 | 359.00 | 538.49 |
| 63 | 23.79 | 47.59 | 95.18 | 190.36 | 285.54 | 63 | 45.96 | 91.93 | 183.86 | 367.72 | 551.57 |
| 64 | 24.36 | 48.73 | 97.45 | 194.91 | 292.36 | 64 | 47.06 | 94.13 | 188.25 | 376.51 | 564.76 |
| 65 | 24.94 | 49.87 | 99.75 | 199.50 | 299.24 | 65 | 48.17 | 96.34 | 192.68 | 385.37 | 578.05 |
| 66 | 25.51 | 51.03 | 102.06 | 204.12 | 306.17 | 66 | 49.29 | 98.57 | 197.15 | 394.29 | 591.44 |
| 67 | 26.10 | 52.19 | 104.39 | 208.77 | 313.16 | 67 | 50.41 | 100.82 | 201.64 | 403.29 | 604.93 |
| 68 | 26.68 | 53.37 | 106.73 | 213.46 | 320.20 | 68 | 51.54 | 103.09 | 206.17 | 412.35 | 618.52 |
| 69 | 27.27 | 54.55 | 109.10 | 218.19 | 327.29 | 69 | 52.68 | 105.37 | 210.74 | 421.48 | 632.22 |
| 70 | 27.87 | 55.74 | 111.48 | 222.95 | 334.43 | 70 | 53.83 | 107.67 | 215.34 | 430.67 | 646.01 |

FIG. 4B

| Time table for 180 deg rotation (in minutes) ||||||| Time table for 90 deg rotation (in minutes) ||||||
|---|---|---|---|---|---|---|---|---|---|---|---|
| | Inches of water ||||| | | Inches of water |||||
| PSI | 0.25" | 0.5" | 1" | 2" | 3" | PSI | 0.25" | 0.5" | 1" | 2" | 3" |
| 40 | 4.45 | 8.90 | 17.80 | 35.60 | 53.41 | 40 | 2.23 | 4.45 | 8.90 | 17.80 | 26.70 |
| 41 | 4.62 | 9.24 | 18.47 | 36.95 | 55.42 | 41 | 2.31 | 4.62 | 9.24 | 18.47 | 27.71 |
| 42 | 4.79 | 9.58 | 19.15 | 38.31 | 57.46 | 42 | 2.39 | 4.79 | 9.58 | 19.15 | 28.73 |
| 43 | 4.96 | 9.92 | 19.84 | 39.68 | 59.53 | 43 | 2.48 | 4.96 | 9.92 | 19.84 | 29.76 |
| 44 | 5.13 | 10.27 | 20.54 | 41.08 | 61.61 | 44 | 2.57 | 5.13 | 10.27 | 20.54 | 30.81 |
| 45 | 5.31 | 10.62 | 21.24 | 42.48 | 63.73 | 45 | 2.66 | 5.31 | 10.62 | 21.24 | 31.86 |
| 46 | 5.49 | 10.98 | 21.95 | 43.91 | 65.86 | 46 | 2.74 | 5.49 | 10.98 | 21.95 | 32.93 |
| 47 | 5.67 | 11.34 | 22.67 | 45.35 | 68.02 | 47 | 2.83 | 5.67 | 11.34 | 22.67 | 34.01 |
| 48 | 5.85 | 11.70 | 23.40 | 46.80 | 70.20 | 48 | 2.93 | 5.85 | 11.70 | 23.40 | 35.10 |
| 49 | 6.03 | 12.07 | 24.14 | 48.27 | 72.41 | 49 | 3.02 | 6.03 | 12.07 | 24.14 | 36.20 |
| 50 | 6.22 | 12.44 | 24.88 | 49.76 | 74.64 | 50 | 3.11 | 6.22 | 12.44 | 24.88 | 37.32 |
| 51 | 6.41 | 12.81 | 25.63 | 51.26 | 76.89 | 51 | 3.20 | 6.41 | 12.81 | 25.63 | 38.44 |
| 52 | 6.60 | 13.19 | 26.39 | 52.77 | 79.16 | 52 | 3.30 | 6.60 | 13.19 | 26.39 | 39.58 |
| 53 | 6.79 | 13.58 | 27.15 | 54.30 | 81.45 | 53 | 3.39 | 6.79 | 13.58 | 27.15 | 40.73 |
| 54 | 6.98 | 13.96 | 27.92 | 55.85 | 83.77 | 54 | 3.49 | 6.98 | 13.96 | 27.92 | 41.89 |
| 55 | 7.18 | 14.35 | 28.70 | 57.41 | 86.11 | 55 | 3.59 | 7.18 | 14.35 | 28.70 | 43.05 |
| 56 | 7.37 | 14.74 | 29.49 | 58.98 | 88.47 | 56 | 3.69 | 7.37 | 14.74 | 29.49 | 44.23 |
| 57 | 7.57 | 15.14 | 30.28 | 60.56 | 90.85 | 57 | 3.79 | 7.57 | 15.14 | 30.28 | 45.42 |
| 58 | 7.77 | 15.54 | 31.08 | 62.17 | 93.25 | 58 | 3.89 | 7.77 | 15.54 | 31.08 | 46.62 |
| 59 | 7.97 | 15.95 | 31.89 | 63.78 | 95.67 | 59 | 3.99 | 7.97 | 15.95 | 31.89 | 47.84 |
| 60 | 8.18 | 16.35 | 32.70 | 65.41 | 98.11 | 60 | 4.09 | 8.18 | 16.35 | 32.70 | 49.06 |
| 61 | 8.38 | 16.76 | 33.53 | 67.05 | 100.58 | 61 | 4.19 | 8.38 | 16.76 | 33.53 | 50.29 |
| 62 | 8.59 | 17.18 | 34.35 | 68.71 | 103.06 | 62 | 4.29 | 8.59 | 17.18 | 34.35 | 51.53 |
| 63 | 8.80 | 17.59 | 35.19 | 70.38 | 105.56 | 63 | 4.40 | 8.80 | 17.59 | 35.19 | 52.78 |
| 64 | 9.01 | 18.01 | 36.03 | 72.06 | 108.09 | 64 | 4.50 | 9.01 | 18.01 | 36.03 | 54.04 |
| 65 | 9.22 | 18.44 | 36.88 | 73.75 | 110.63 | 65 | 4.61 | 9.22 | 18.44 | 36.88 | 55.31 |
| 66 | 9.43 | 18.87 | 37.73 | 75.46 | 113.19 | 66 | 4.72 | 9.43 | 18.87 | 37.73 | 56.60 |
| 67 | 9.65 | 19.30 | 38.59 | 77.18 | 115.77 | 67 | 4.82 | 9.65 | 19.30 | 38.59 | 57.89 |
| 68 | 9.86 | 19.73 | 39.46 | 78.92 | 118.38 | 68 | 4.93 | 9.86 | 19.73 | 39.46 | 59.19 |
| 69 | 10.08 | 20.17 | 40.33 | 80.66 | 121.00 | 69 | 5.04 | 10.08 | 20.17 | 40.33 | 60.50 |
| 70 | 10.30 | 20.61 | 41.21 | 82.42 | 123.64 | 70 | 5.15 | 10.30 | 20.61 | 41.21 | 61.82 |

FIG. 6B

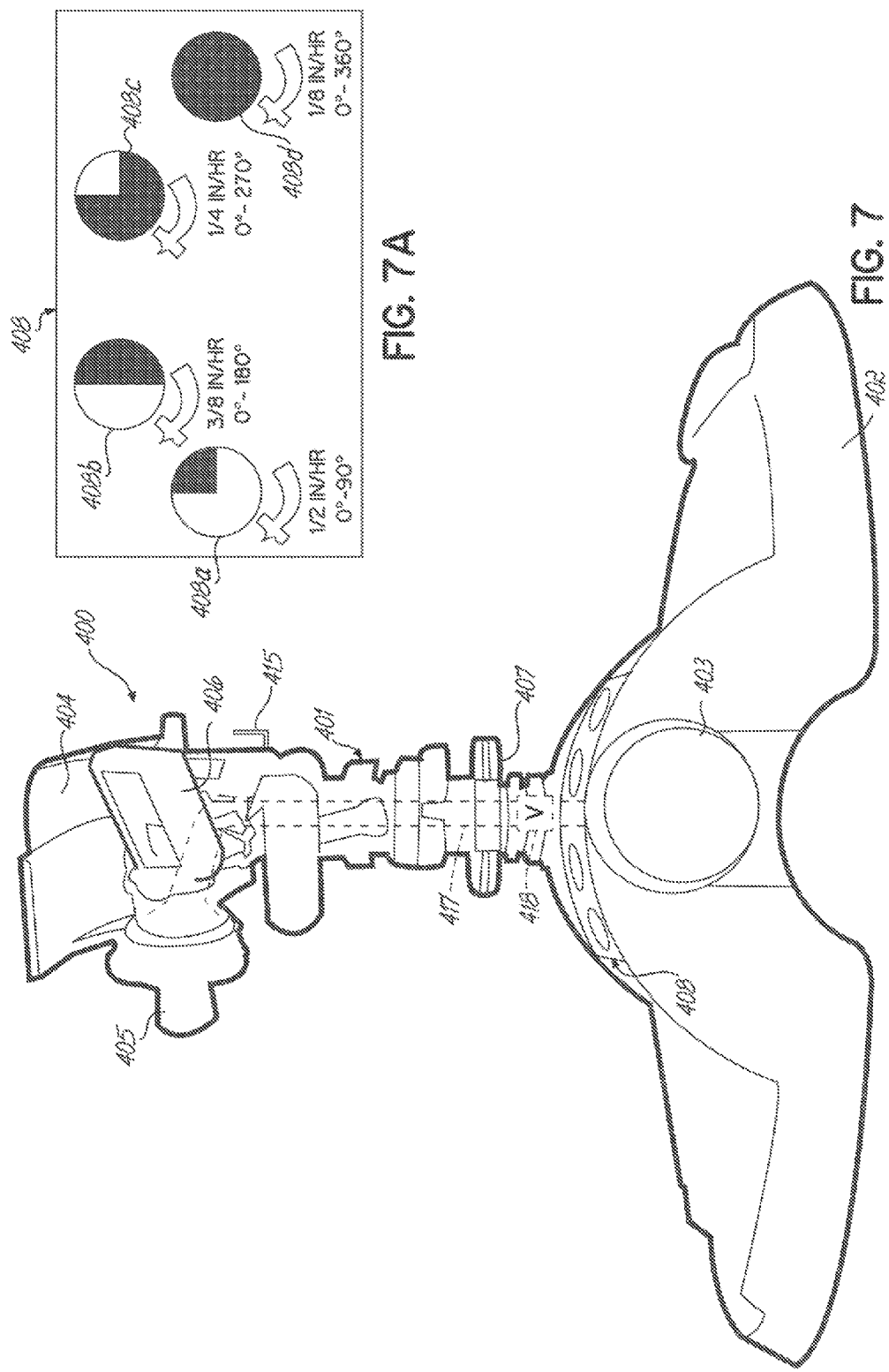

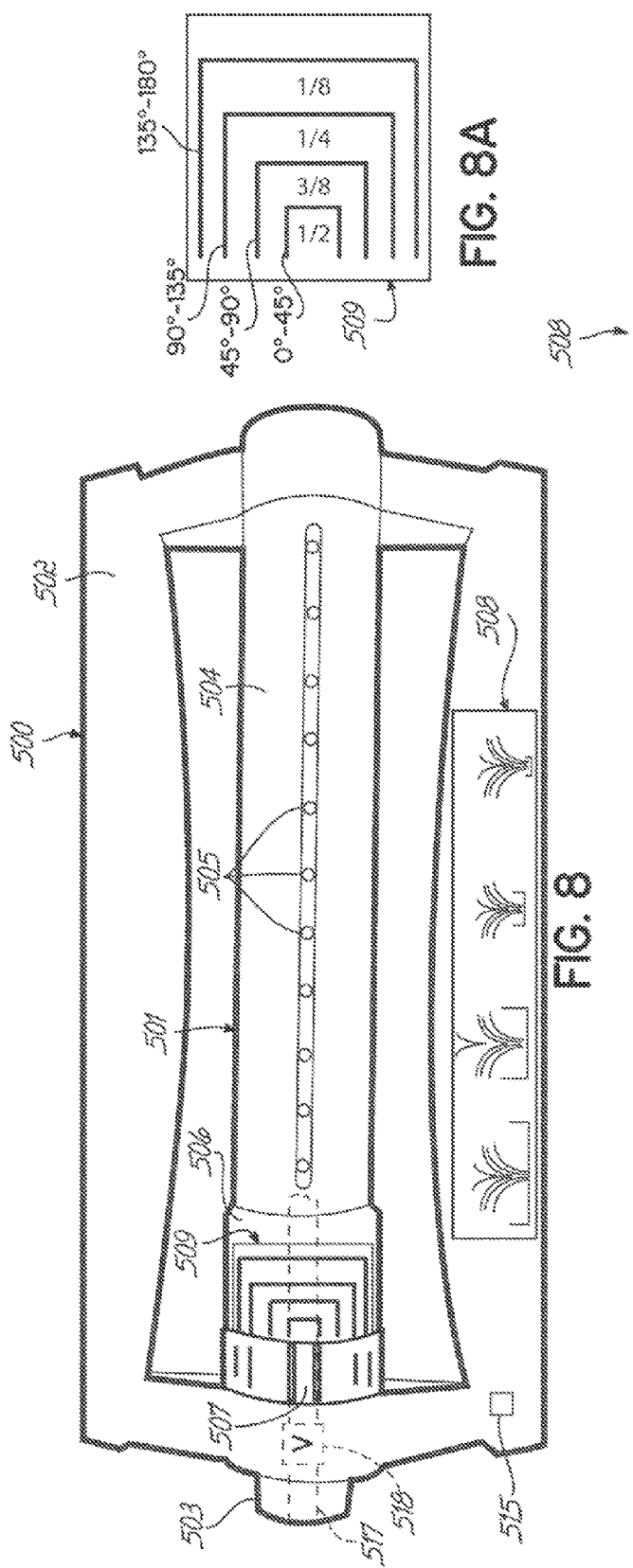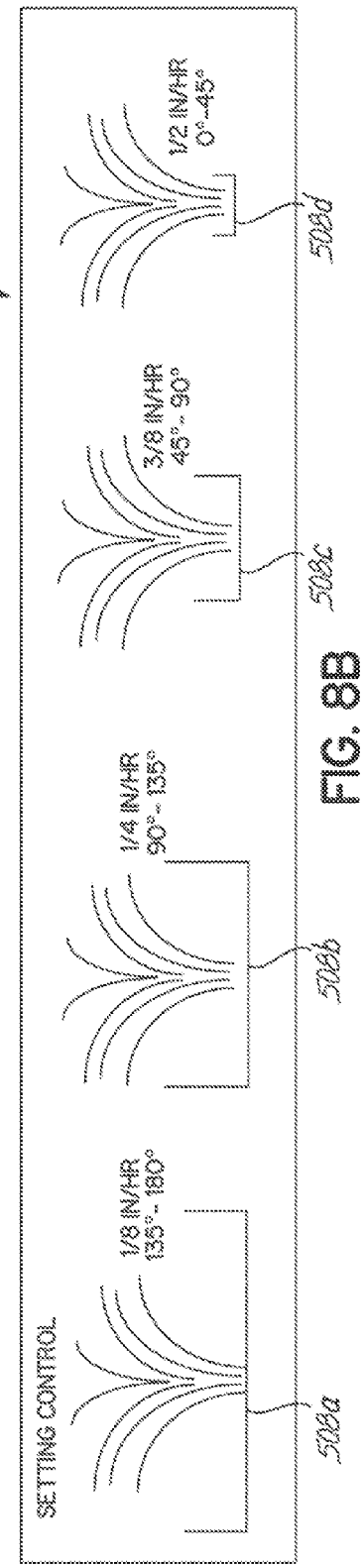
FIG. 8
FIG. 8A
FIG. 8B

WATER FLOW METERING DEVICE

This application claims priority of U.S. Provisional Patent Application No. 61/449,362, which was filed on Mar. 4, 2011 and is incorporated in its entirety herein by reference.

TECHNICAL FIELD

The present invention relates to garden watering devices and, more particularly, to a garden watering device that correlates user selected spray patterns to water depth over time.

BACKGROUND OF THE INVENTION

Many landowners take a great interest in growing and maintaining good looking lawns and landscapes. This is often achieved, in part, by supplementing the volume of natural rain fall through the use of lawn sprinklers or in-ground irrigation systems. Water, however, is becoming an increasingly scarce resource. Developed countries such as the United States are beginning to experience regional water shortages; for example, in the Atlanta area and Southern California. Experts in the field of water management forecast that regional fresh water shortages such as these will likely increase over coming decades. Accordingly there is an increased need for conservation methods.

Turning to lawn sprinklers, one shortcoming of current sprinkler designs is the fact that they have no means to communicate to the user the depth of water distributed by the selected pattern's coverage area over a given period of time. For example, some sprinklers offer a semi circular pattern, others a full circle, others a square pattern and still others a rectangular pattern. Many horticulturists and seed developers use such figures in developing protocols or instructions for the care of various plants such as lawn grasses. With this in mind, a user wants to provide enough water using a sprinkler system to maximize plant health, but also wants to avoid overwatering for both plant health and conservation reasons. However, conventional sprinkler systems leave the user to make the depth over time quantification by other means. Furthermore, reconciling the results of such a calculation with varying amounts of rainfall between watering makes the task yet more difficult.

A number of garden watering devices have been created to begin addressing these problems. Flow control valves, such as the type disclosed in U.S. Pat. No. 7,028,984 to Wang, allow an operator to control the output level of a lawn sprinkler attached to a water hose. Other devices, such as the type disclosed in U.S. Pat. No. 4,130,135 to Moore, are timers which allow the operator to set a sprinkler to only be operational for a predetermined period of time before actuating a valve that closes off water supply to the lawn sprinkler.

However, the aforementioned devices suffer from various drawbacks. Although these devices allow the operator to control the output level of a sprinkler or the period of time for which the sprinkler is operational, none of these devices allow the operator to accurately determine the volume of water being released over a period of time, due in part to varying flow pressure supplied by a spigot at different houses. Therefore, a landowner would still need to provide the additional accurate measuring means for determining how much water is being delivered to the lawn, particularly the depth. There would be no way to accurately provide a fixed volume of water in the recommended amount of inches per week using the conventional devices without constant monitoring of the system, which reduces the benefit of owning an automatic lawn sprinkler device. Thus, it would be desirable to provide a sprinkler system which helps a user sprinkle the desired amount of water and overcome these deficiencies of conventional sprinkler systems.

SUMMARY OF THE INVENTION

Embodiments of the present invention relate to a water flow metering device for managing the amount of water sprayed from a sprinkler. In particular, the water flow metering device disclosed herein allows a user to control the volume of water sprayed from a sprinkler, thereby also providing control over the depth of water provided at the watered surface.

Understanding and controlling the depth of water provided from a sprinkler is advantageous in applications where watering recommendations are provided in terms of a depth of water per unit of time. For example, grass seed for a lawn may come with instructions that the ground containing freshly planted grass seed should be watered in an amount of one inch per day.

A water flow metering device as disclosed herein includes a shut-off valve disposed in a water passage of the device body of a sprinkler. A measuring device is disposed in the water passage for measuring water flowing through the water passage. A depth selection device allows a user to set the desired depth of water to be distributed. A controller is operable to open and close the shut-off valve, and the controller is configured to calculate a duration for the shut-off valve to remain open. The duration is based on the measurement of water flowing through the water passage and the desired depth set by a user.

Advantageously, the water flow metering device may be incorporated in several sprinkler designs. These include, for example, wand-style sprinklers, gear drive sprinklers, impulse or impact head sprinklers, elongate oscillatory sprinklers, single-pattern sprinklers such as whirling sprinklers, water pistols, and the like.

The flow metering device may also include or be associated with a timing mechanism including a timer for closing the shut-off valve after a set period of time. The flow metering device may also include or be associated with an accumulator for measuring an amount of natural rainfall, and the duration for the shut-off valve to remain open may be affected by the amount of natural rainfall.

Methods for distributing water with a sprinkler device over a surface are also provided, where the sprinkler device is operated for a duration to provide a desired depth amount of water. The duration is based on at least a user-selected depth amount and the volumetric flow rate of water that occurs through the sprinkler device.

A device for measuring flow of water and for providing depth over time information to a user is also provided. The device is positionable between a water source and a sprinkler having a known distribution pattern. The device includes a pressure gauge. An information chart is provided with the device that relates pressure, distribution patterns, and depth over time information. A chart interpretation tool is provided that may be used with the information chart.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 4B is a data table associated with a water distribution system controller;

FIG. 6B is a data table associated with a water distribution system controller;

FIG. 7 is a schematic view of another embodiment of a water flow metering device used in conjunction with an impulse head sprinkler;

FIG. 7A is a front view of the label on the impulse head sprinkler of FIG. 7;

FIG. 8 is a schematic view of another embodiment of a water flow metering device used in conjunction with an oscillating sprinkler;

FIG. 8A is a front view of the gearbox label of the oscillating sprinkler of FIG. 8;

FIG. 8B is a front view of the label on the oscillating sprinkler of FIG. 8;

DETAILED DESCRIPTION

Figure 1:
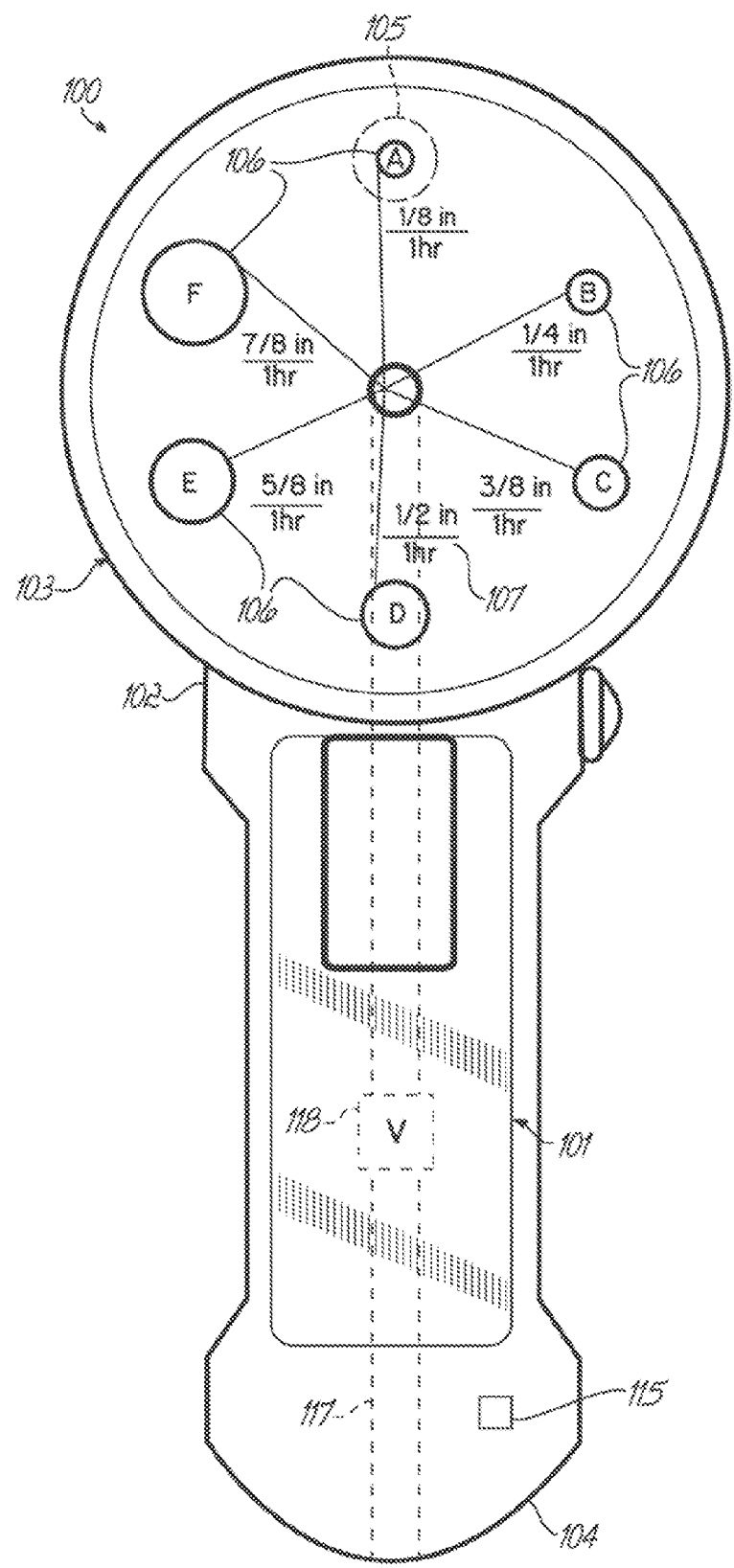
FIG. 1 is a schematic view of the water flow metering device with a pressure control valve in accordance with one embodiment of the invention.
Figure 2:
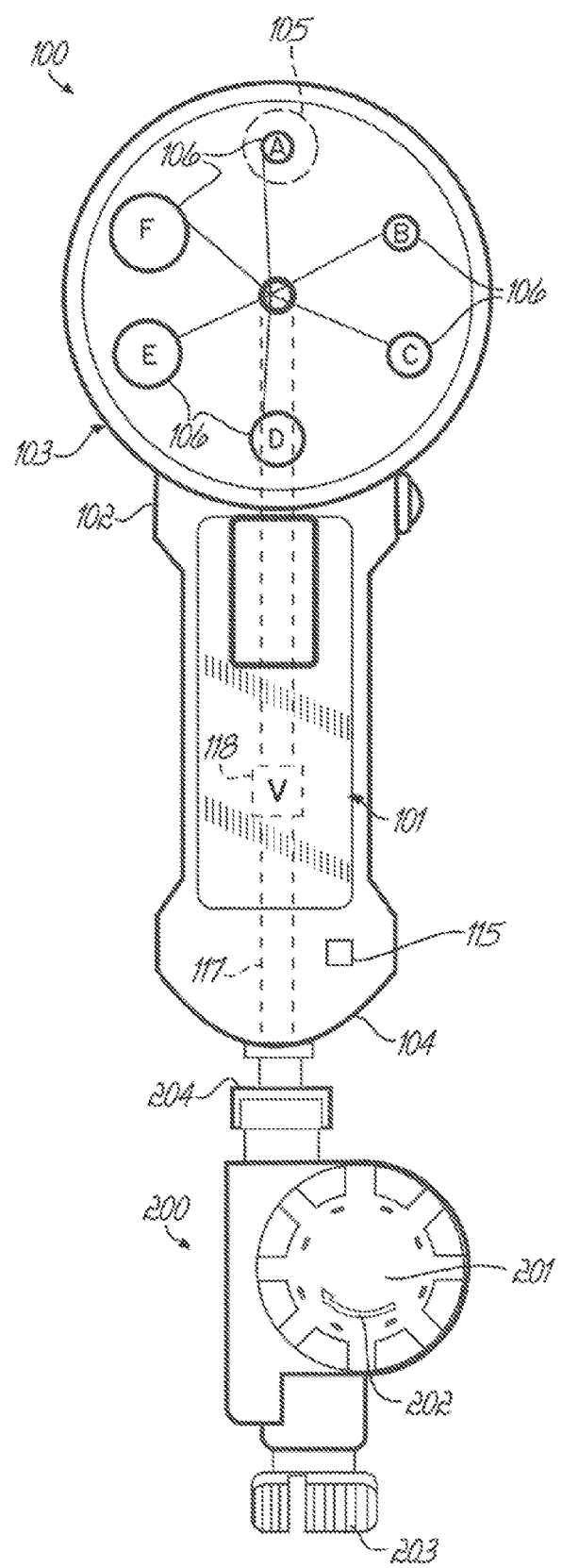
FIG. 2 is a schematic view of the water flow metering device of FIG. 1 coupled with a timer and shutoff valve.

The figures demonstrate multiple embodiments of a water flow metering device for managing amounts of water discharged, or sprayed, from a sprinkler. In FIGS. 1 and 2, one embodiment of the water flow metering device 100 consists of a wand-style sprinkler having a device body 101, a water distribution head 102, a pressure control valve 118, and a flow pattern selector 103. The device body 101 includes a water inlet 104 and an internal passage 117. The internal passage 117 is in fluid communication with the water distribution head 102, which includes a discharge orifice 105 directed upward out of the page in FIGS. 1 and 2. The pressure control valve is disposed within the internal passage 117 between the water inlet 104 and the water distribution head 102, and the pressure control valve 118 limits the pressure of water entering the water flow metering device 100 to a predetermined pressure. In some embodiments, the pressure control valve 118 may be an elongate orifice that forces any incoming water pressure within a normal residential range of 40-100 psi to a predetermined pressure of approximately 40 psi. Another example of a pressure control valve 118 may be found in the disclosure of U.S. Pat. No. 2,053,931 to Work, the disclosure of which is hereby incorporated by reference in its entirety, although other designs of a pressure control valve 118 are possible. The pressure control valve 118 may also be positively closed in some embodiments to stop supply of water to the water distribution head 102. The flow pattern selector 103 is a rotatable dial including a plurality of flow outlets 106 configured to rotate into communication with the discharge orifice 105. Although the flow pattern selector dial 103 may include any number of flow outlets 106 of different shapes and sizes, the illustrated dial 103 includes six: A, B, C, D, E and F.

Each flow outlet 106 is configured to allow a different amount of water to pass through the selector dial 103. The selector dial 103 also includes a label 107 providing indicia showing the amount of water discharged by the water flow metering device 100 when a particular flow outlet 106 has been selected. The amount of water discharged is calculated based on the predetermined pressure delivered through the pressure control valve 118 and the size of the respective flow outlet 106. Although various volume measurement standards can be used on the label 107 to indicate the amount of water discharged, in the present embodiment the discharge is measured in inches per hour, which is convenient for watering lawns with grass seed that requires a certain amount of watering measured in inches per week. As shown by the label 107 on the illustrated selector dial 103, flow outlet A meters water flow to spray at about a rate of ⅛ inches per hour. Flow outlet B meters water flow to spray at about a rate of ¼ inches per hour. Flow outlet C meters water flow to spray at about a rate of ⅜ inches per hour. Flow outlet D meters water flow to spray at about a rate of ½ inches per hour. Flow outlet E meters water flow to spray at about a rate of ⅝ inches per hour. Flow outlet F meters water flow to spray at about a rate of ⅞ inches per hour.

In use, the operator selects the flow outlet 106 corresponding to the volume flowrate of water desired to be discharged over an area. Using the label 107, the operator is able to determine the time period over which to leave the sprinkler activated, based on the flow outlet 106 selected, in order to achieve the desired depth of water discharged over an area. Therefore, a landowner can ensure that grass seed or fertilizer on a lawn receives adequate watering without wasting excess amounts of water.

In another embodiment, the pressure control valve 118 may be adjustable over a range of pressures. In this case, the water distribution head 102 may receive a plurality of selector dials each associated with a different water pressure setting. Alternatively, the label 107 may include a plurality of indicia associated with a plurality of different water pressure settings, such that the water flow rate selection may be made under different conditions.

In the illustrated embodiment shown in FIG. 2, the water flow metering device 100 may also be coupled with a timing mechanism 200. The timing mechanism 200 can be a timer shutoff valve 200 such as disclosed in U.S. Pat. No. 6,398,185 to Wang, for example, which patent and disclosure are incorporated by reference herein. The timer shutoff valve 200 includes a valve which normally closes off flow from a timer inlet 203 coupled to a water hose to a timer outlet 204 coupled to the water inlet 104 of the water flow metering device 100. When a timer 201 is wound in a clockwise direction as indicated by arrow 202, the valve inside the timer shutoff valve 200 is opened and water is allowed to flow through the water flow metering device 100. Alternatively, the timing mechanism 200 may open and close the pressure control valve 118 previously described to permit the flow of water through the water flow metering device 100. A torsion spring drives an intermittent gear set to return the timer 201 back to the original position after a predetermined period of time as needed by the operator. When the timer 201 is completely returned to the original position, the valve portion of the timer shutoff valve 200 is activated and the flow of water to the sprinkler is blocked again. Thus, the water flow metering device 100 and the timer shutoff valve 200 can be used in conjunction so that an operator can set an amount of watering to be done and then leave the area until it is convenient to return without risk of overwatering.

In one embodiment, the timing mechanism 200 may also include an accumulator device 115. The accumulator device 115 may be coupled to the device body 101 or molded into the device body 101 as a cavity for collecting ambient or natural rainfall in the area of the water flow metering device 100. The accumulator device 115 operates like a rain gauge and may include a sensor for detecting the amount of natural rainfall in inches per hour. Consequently, the accumulator device 115 may communicate with the timing mechanism 200 to permit the timing mechanism 200 to adjust the amount of watering done before the water supply is cut off from the water distribution head 102. Thus, the accumulator device 115 further prevents overwatering of the sprinkler area.

Alternatively, the accumulator device 115 may be incorporated on embodiments of the water flow metering device 100 without a timing mechanism 200. The accumulator device 115 is still coupled to the device body 101 or molded into the device body 101 as a cavity for collecting ambient or natural rainfall. A user may personally check the accumulator device 115 to determine what flow pattern and length of watering time need to be selected to provide optimum watering.

Figure 3:
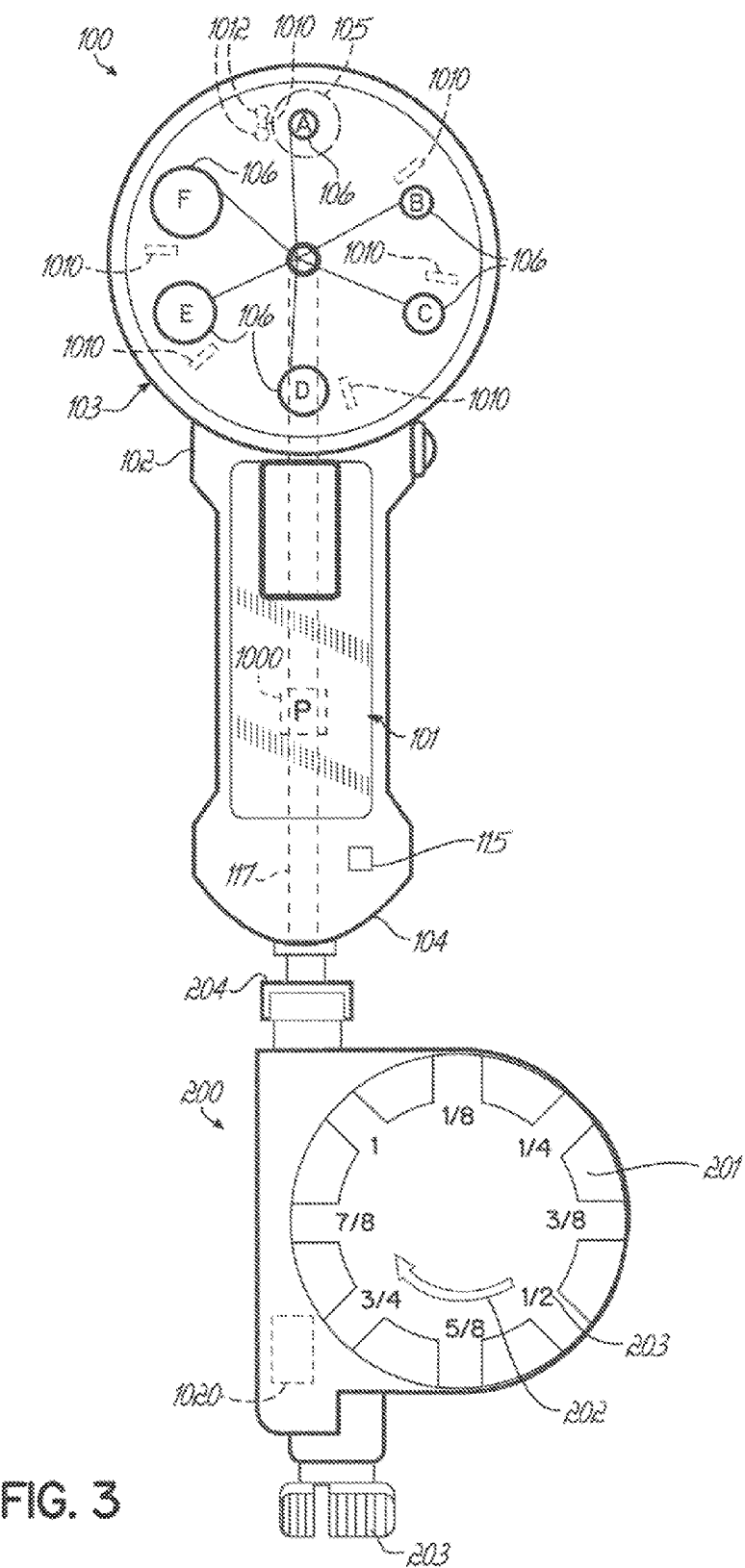
FIG. 3 is a schematic view of a water flow metering device with a pressure transducer in accordance with another embodiment of the invention.

In the illustrated embodiment shown in FIG. 3, a flow water metering device 100 may include a pressure transducer 1000 rather than a pressure control valve as earlier described. The pressure transducer 1000 may be disposed within the internal passage 117 of the device housing 101. A controller 1020, electrically connected to other components as further described, is housed within the timing mechanism 200.

Figure 3A:
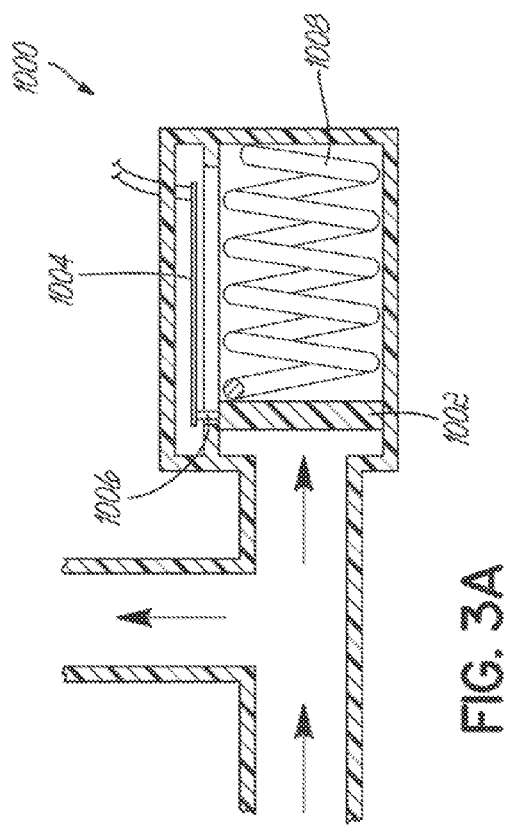
FIG. 3A is a cross sectional view of a pressure transducer in accordance with an embodiment of the invention.

As shown in more detail in FIG. 3A, the pressure transducer 1000 includes a spring-biased stage 1002 that is configured to have a strip of electrically resistant material 1004 along the length of its travel. A pick-up 1006 attached to the stage 1002 interfaces with this material 1004 and forms an electrical circuit which communicates with the controller 1020. Depending on the position along the strip of material 1004 at which the pick-up 1006 interfaces, the circuit will have a different resistance value. This resistance can be used to determine the position of the stage 1002 by measuring the resistance of the circuit. The pressure of the water pushes on the stage 1002 and forces it back until a spring 1008 that provides a biasing force on the stage 1002 reaches equilibrium with the incoming water pressure. Measuring the resistance in the circuit therefore measures the pressure in the water flow.

As shown in FIG. 3, the water flow metering device 100 may also include a series of electrically resistant strips 1010, each associated with one of the six flow outlets 106 (A-F) on the selector dial 103. A pick-up 1012 near the discharge orifice 105 is positioned to connect to the strip 1010 associated with a given flow outlet when that outlet is mated to the orifice 105 as described above, forming a circuit that communicates electrically with the controller 1020. Each of the electrically resistant strips 1010 has a different resistance value. When a circuit is formed between any strip 1010 and the pick-up 1012, measuring the resistance in the circuit indicates which flow outlet 106 is selected for use.

In this embodiment the timer 201 includes indicia 203 which allow a user to select a total depth of water to be distributed by the device 100. The timer 201 is also in electrical communication with the controller 1020.

Figure 4A:
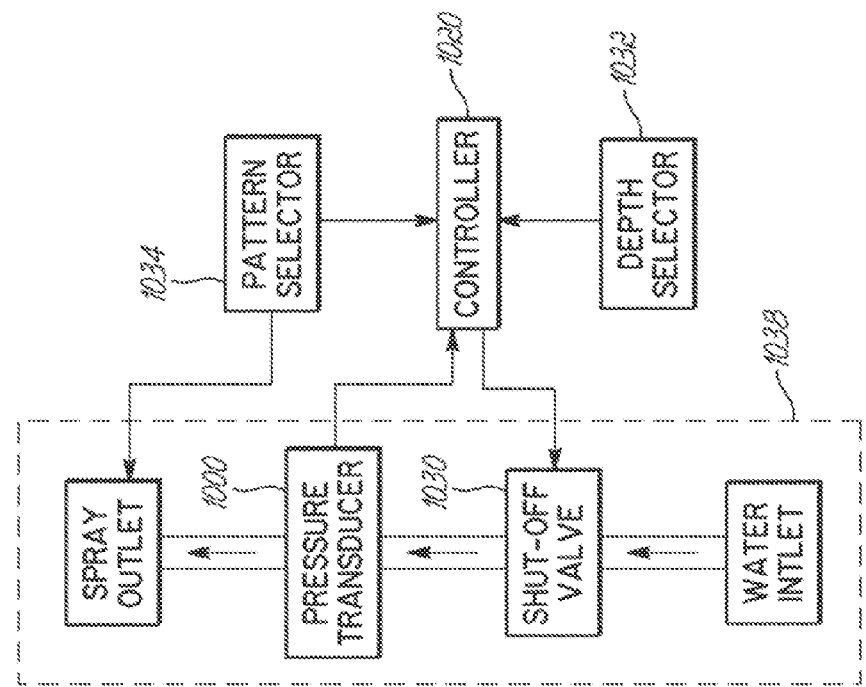
FIG. 4A is a schematic diagram of a water distribution system in accordance with the present invention.

FIG. 4A illustrates the connections between the controller 1020 and other components. The pressure transducer 1000 and a shut-off valve 1030 are disposed within the flow path 1038 between the water inlet 104 and spray outlet 106. The pressure transducer 1000 and shut-off valve 1030 are each in electrical communication with the controller 1020. The shut-off valve 1030 may be part of the timer device 200 as earlier described, or may be another valve component as further described below. A pattern selector 1034 provides a user interface by which to choose a plurality of spray patterns; the pattern selector 1034 may be physically or electronically mated to the spray outlet and communicates with the controller 1020. The pattern selector 1034 may be the selector dial 103 as described above with pick-ups 1012 forming the connection to the controller 1020, or may be any of the flow selection devices described further below. The depth selector 1032, which may be the timer dial 201 described above, is the device by which a user selects a depth of water to be distributed through the spray device 100, and may be any of a number of different user interfaces including those further described below.

The controller 1020 receives input from the pattern selector 1034 indicating the selected spray pattern and input from the pressure transducer 1000 indicating the measured volumetric flow of the water, from which the controller 1020 determines a depth-per-time value for the water flowing through the device. When a desired distribution depth is input from the depth selector 1032, the controller uses the depth per time to further determine how long the device should run in order to distribute the desired depth of water. After the calculated amount of time has elapsed, the controller 1020 activates the shut-off valve 1030 to shut off the water flow to the device 100 and prevent further distribution of water, thus limiting the water distribution to the amount selected by the user.

The controller 1020 may determine the amount of time to run the water metering device 100 in a variety of ways. In one embodiment, memory associated with the controller 1020 may include data that matches water pressure within a given range to a set of time values associated with each available depth selection. A separate data table may exist for each spray pattern selection. Where some of the data displayed comes from an analog source, the data tables could reflect a range of values. Example tables for two spray patterns are shown as FIG. 4B.

In addition to this indexing system, the controller 1020 could instead use a variety of calculations to determine the correct time. For example, the value from the pressure transducer 1000 could be used to generate a volume per unit time value V/t, and the value from the pattern selector 1034 could be used to produce an area value A. Each of V/t and A may be calculable from known geometric and flow equations or determined empirically, and may be produced by functions called by the controller, by the use of simplified look-up tables, or otherwise determined by the controller as known in the art. If the user inputs a desired distribution depth d, the equation that determines the distribution of water would be:

$$d=[(V/t)/A]*t \qquad (1)$$

Which means that the amount of time that the device needs to run with the established configuration is:

$$t=d*A/(V/t) \qquad (2)$$

The controller 1020 could be easily configured to allow the device 100 to run for the calculated value of time t generated by the above equation.

One of ordinary skill will understand that in some situations, the water flow may vary significantly over the course of the water distribution process. In another embodiment of a water distribution system, the controller 1020 may evaluate the volumetric flow of water at set intervals, for example once per second, and may use formula (1) above to calculate the depth of water distributed over the set interval assuming one unit of time running at the measured geometric flow. The controller 1020 keeps a counter of the total depth of water distributed and adds the new calculated water depth to the previous total, then checks the new total against the user-entered depth goal to determine whether to activate the shut-off valve 1030 to shut off the water. This updating evaluation by the controller may produce more accurate water distribution in response to variable pressure conditions. If the accumulator device 115 is also connected to the controller 1020, natural rainfall can be added to the distributed water total to further reduce runtime and prevent over-watering.

One of ordinary skill in the art will recognize other advantageous embodiments that lie within the scope of this invention, some of which are outlined below. As one example, the pressure transducer 1000 may be replaced by any device that can measure the volumetric flow of the water with sufficient accuracy for the controller 1020 to make a depth of distribution calculation. In another embodiment, the pressure transducer 1000 could be an optical encoder as known in the art, a rotor associated with the encoder being disposed within the flow of water in order to allow for measurement of the velocity of the water. Any device which allows the controller to determine the volumetric flow of water would be sufficient to carry out the invention as herein described.

In another embodiment, an adjustable pressure control valve may be used in place of a pressure transducer, the pressure control valve communicating with the controller 1020 to convey the user-selected pressure setting to the controller 1020 for accurate timing calculations as described above.

FIGS. 5-8B illustrate additional embodiments of a water flow metering device, indicated by the numerals 300, 400, 500, in use on various types of angle-control multi-pattern sprinklers. In one of these alternative embodiments, shown in FIGS. 5 and 5A, a water flow metering device 300 is incorporated in a gear drive sprinkler having a device body 301. The device body 301 includes a spike 302 for being driven into the ground, a water inlet 303 for coupling to a water hose, and a main body portion 304 having an internal flow passage 317 leading to a discharge head 305. A pressure control valve 318 is disposed within the internal flow passage 317 between the water inlet 303 and the discharge head 305, and the pressure control valve 318 limits the pressure of water entering the water flow metering device 300 to a predetermined pressure. Internal gearing drives the discharge head 305 to rotate and spray in an arc. The length of the spray arc can be modified by the flow pattern selector 306 of this embodiment, which is a tab 307 secured to the discharge head 305 and a pair of brackets 308a, 308b secured to the main body portion 304. The operator positions the brackets 308a, 308b to allow the discharge head 305 to oscillate for a desired arc length or range. The force generated by the rotation of the discharge head 305 pushes the tab 307 against one of the brackets 308a, 308b. The force of the tab 307 against the bracket 308a, 308b causes the tab 307 to shift the set of gears inside the gear drive, causing the discharge head 305 to begin rotation in the opposite direction.

Figures 5, 5A:
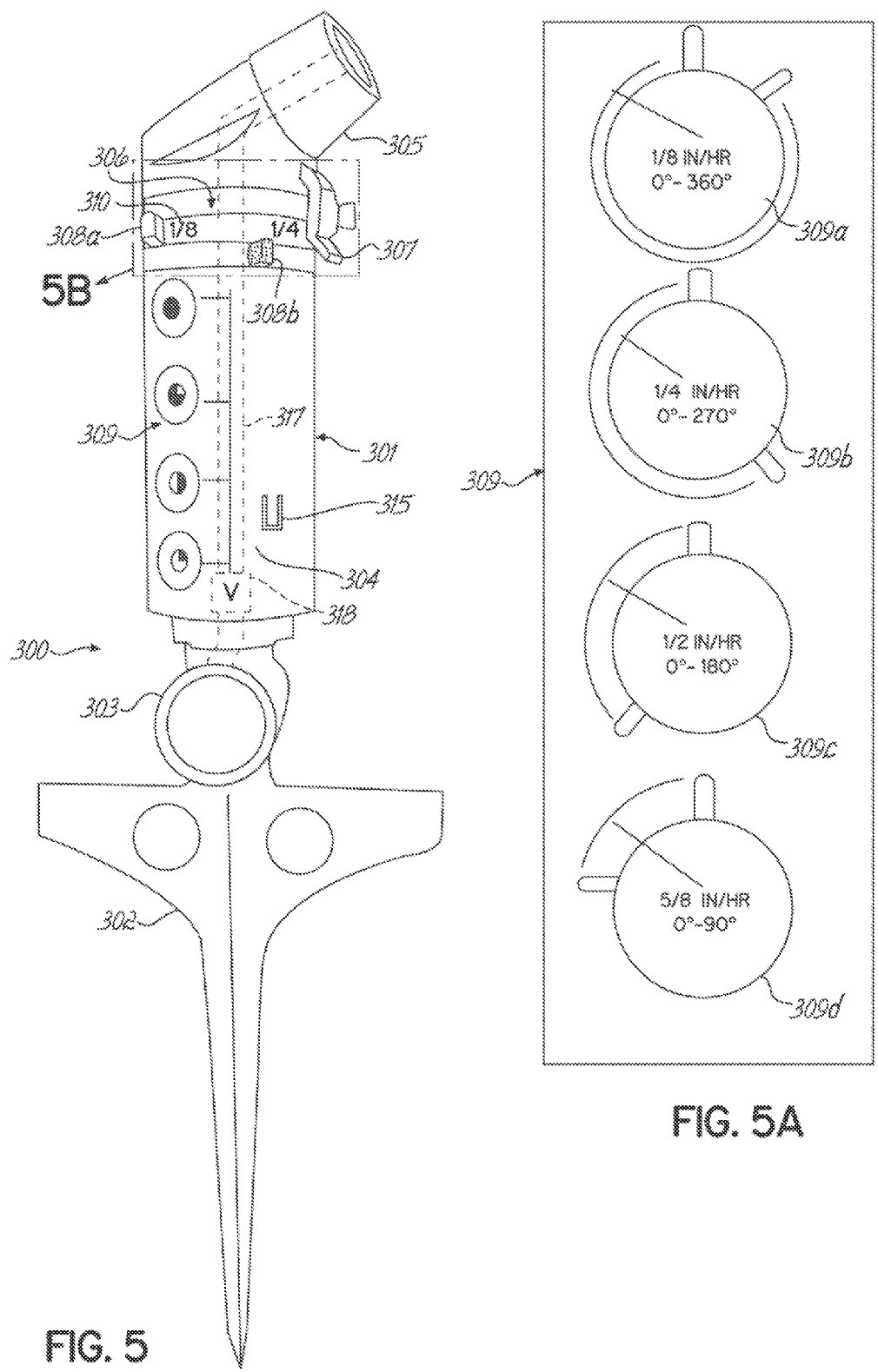
FIG. 5 is a schematic view of another embodiment of a water flow metering device used in conjunction with a gear drive sprinkler.
FIG. 5A is a front view of the label on the gear drive sprinkler of FIG. 5.

The main body portion 304 includes a label 309 illustrating different degrees of rotation set by moving the brackets 308 to the illustrated positions. As shown in FIG. 5A, the label 309 also provides indications of how many inches per hour of water will be delivered by the water flow metering device 300 in the illustrated positions. Thus, for a full 360 degrees of rotation, the water flow metering device 300 will spray the area with ⅛ inches per hour (309a). For 270 degrees of rotation, the water flow metering device 300 will spray the area with ¼ inches per hour (309b). For 180 degrees of rotation, the water flow metering device 300 will spray the area with ½ inches per hour (309c). For 90 degrees of rotation, the water flow metering device 300 will spray the area with ⅝ inches per hour (309d). The brackets 308 may also be used in conjunction with another set of indicia 310 in order to convey the depth per hour information as well. The indicia 310 are placed on the ring associated with one bracket 308a as shown, such that the other bracket 308b is positioned directly below a depth per hour rate associated with the angle formed between the two brackets. The bracket 308b may be the color of the indicia 310 in order to make the displayed information more intuitive; alternatively, an arrow or other marking on the bracket 308b may direct the user's attention to the depth rate distribution information shown.

In use, the operator uses the brackets 308 to select a range for the discharge head 305 to oscillate based on the size of the area the operator wishes to water, and leaves the device 300 active for the amount of time necessary to achieve the desired depth of water. The water flow metering device 300 may also be combined with a timer mechanism 200 and/or an accumulator device 315 as previously described.

Figure 5B:
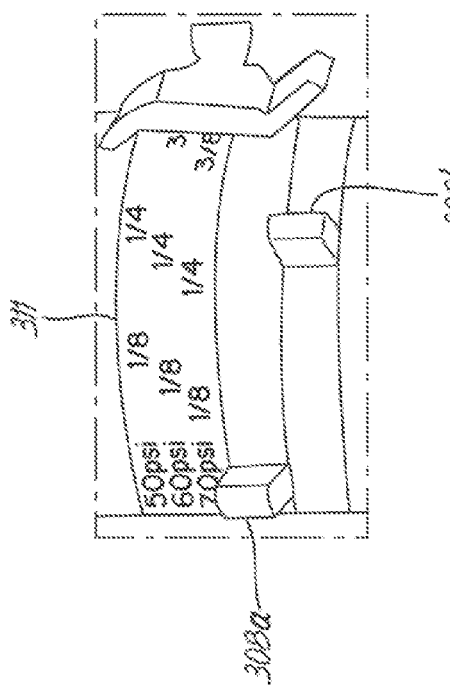
FIG. 5B is a partial front view of alternate indicia for the brackets of the device of FIG. 5.

In another embodiment, shown in FIG. 5B, the pressure control valve 318 may be adjustable over a range of pressure values, and an indicia ring 311 proximate the brackets 308a, 308b may include multiple sets of indicia to allow for multiple pressure settings as shown. The indicia ring 311 may be independently rotatable to align its "zero" mark with the upper bracket 308a, the alignment of the lower bracket 308b with the proper segment of the ring conveying the flow rate information for the given angle setting.

Figure 6A:
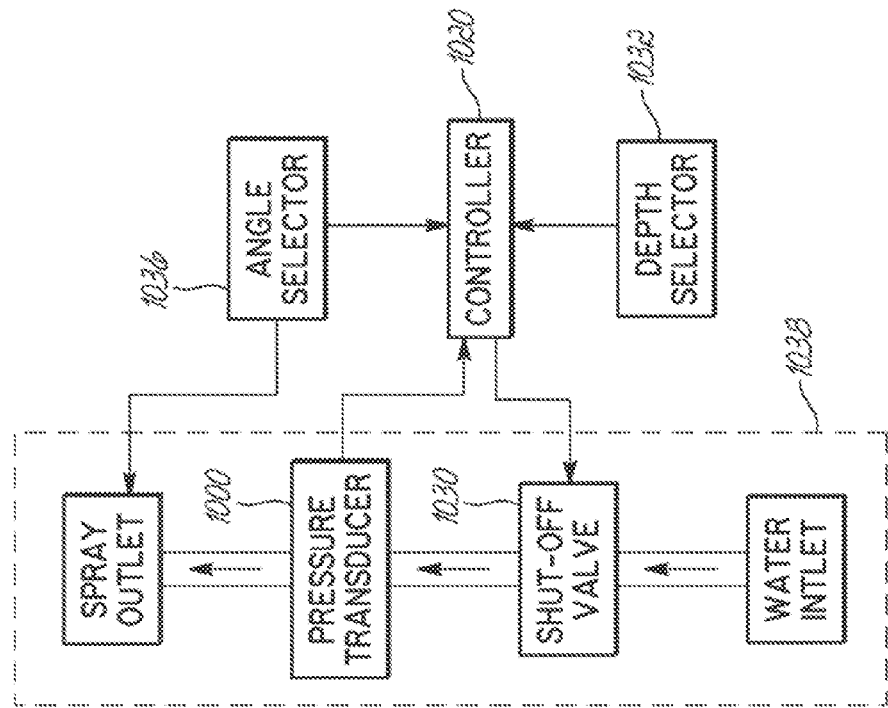
FIG. 6A is a schematic diagram of a water distribution system in accordance with the present invention.

As described above with respect to the device 100, the device 300 may also include a pressure transducer or other volumetric flow measurement device in place of the pressure control valve 318, and include an associated controller 1020 as illustrated in FIG. 6A. The brackets 308a, 308b, acting as the angle selector 1036, may be electrically connected to the controller 1020 and act as a pattern selector 1034. FIG. 6B is an example of one set of tables that may be appropriate for use with a controller 1020 and the device 300.

In another embodiment of the water flow metering device 400 provided in FIGS. 7 and 7A, the flow metering device is incorporated in an impulse or impact head sprinkler having a device body 401. The device body 401 has a base 402 with a water inlet 403 and a discharge head 404 with a flow outlet 405 and a spring-loaded arm 406. A pressure control valve 418 is disposed in an internal passage 417 between the water inlet 403 and the discharge head 404, and the pressure control valve 418 limits the pressure of water entering the water flow metering device 400 to a predetermined pressure. The water flow metering device 400 further includes a flow pattern selector 407 which in the illustrated embodiment is a member 407 that limits the rotational arc of the device body 401. The water exits the flow outlet 405 and impacts the spring-loaded arm 406, which recoils and causes the device body 401 to rotate before returning to impact the flow again.

The base 402 includes a label 408 which shows the amount of water flow the water flow metering device 400 will deliver at different settings of the flow pattern selector 407. In the illustrated label 408 of FIG. 4A, for a full 360 degrees of rotation, the water flow metering device 400 will spray the area with ⅛ inches per hour (408d). For 270 degrees of rotation, the water flow metering device 400 will spray the area with ¼ inches per hour (408c). For 180 degrees of rotation, the water flow metering device 400 will spray the area with ⅜ inches per hour (408b). For 90 degrees of rotation, the water flow metering device 400 will spray the area with ½ inches per hour (408a). In use, the operator uses the flow pattern selector 407 to select an arc for the discharge head 404 to oscillate through based on the size of the area the operator wishes to water, and leaves the device 400 active for the amount of time necessary to achieve the desired depth of water. Indicia may be added proximate the flow pattern selector 407, to indicate water depth for a given setting.

The water flow metering device 400 may also be combined with a timer mechanism 200 and/or an accumulator device 415 in a manner consistent with what was previously described. A pressure transducer 1000 or other volumetric flow measurement device may be used instead of the pressure control valve 418, with the flow pattern selector 407 acting as the angle selector 1036 in carrying out the water control process described above and the system configuration illustrated in FIG. 6A, the controller 1020 and depth selector 1032 being integrated into the device 400 as previously described.

In another embodiment of the water flow metering device 500 provided in FIGS. 8, 8A, and 8B, the flow metering device is incorporated in an elongate oscillating sprinkler having a device body 501. The device body 501 has a base 502 with a water inlet 503 and a discharge tube 504 with a row of flow outlets 505 driven by water flowing through a gearbox 506. A pressure control valve 518 is disposed in an internal passage 517 between the water inlet 503 and the discharge tube 504, and the pressure control valve 518 limits the pressure of water entering the water flow metering device 500 to a predetermined pressure. The water flow metering device 500 further includes a flow pattern selector 507 which in the illustrated embodiment is a switch 507 that limits the rotational arc of the discharge tube 504. The water exits the flow outlets 505 as the discharge tube 504 cycles through arcs of the set amount of degrees. The pressure control valve 518 cooperates with the predetermined outlets 505 for any given user selected pattern to yield the water depth per hour or a range of depth per hour on sprinkler devices where the flow pattern selector is a pair of limiting brackets that limit the rotation of the sprinkler head.

The base 502 includes a label 508 which shows the amount of water flow the metering device 500 will deliver at different settings of the flow pattern selector 507. The water flow metering device 500 may also include a gearbox label 509 as illustrated in FIG. 8A to show the various settings of the flow pattern selector 507. In the illustrated label 508 shown in FIG. 8B, for a 135-180 degrees of rotation, the water flow metering device 500 will spray the area with ⅛ inches per hour (508a). For 90-135 degrees of rotation, the water flow metering device 500 will spray the area with ¼ inches per hour (508b). For 45-90 degrees of rotation, the water flow metering device 500 will spray the area with ⅜ inches per hour (508c). For 0-45 degrees of rotation, the water flow metering device 500 will spray the area with ½ inches per hour (508d). In use, the operator uses the flow pattern selector 507 to select an arc for the discharge tube 504 to oscillate through based on the size of the area the operator wishes to water, and leaves the device 500 active for the amount of time necessary to achieve the desired depth of water.

The water flow metering device 500 may also be combined with a timer mechanism 200 and/or an accumulator device 515 in a manner consistent with what was previously described. A pressure transducer 1000 or other volumetric flow measurement device may be used instead of the pressure control valve 518, with the flow pattern selector switch 507 acting as the angle selector 1036 in carrying out the water control process described above and the system configuration illustrated in FIG. 6A, the controller 1020 and depth selector 1032 being integrated into the device 500 as previously described.

Figure 9:
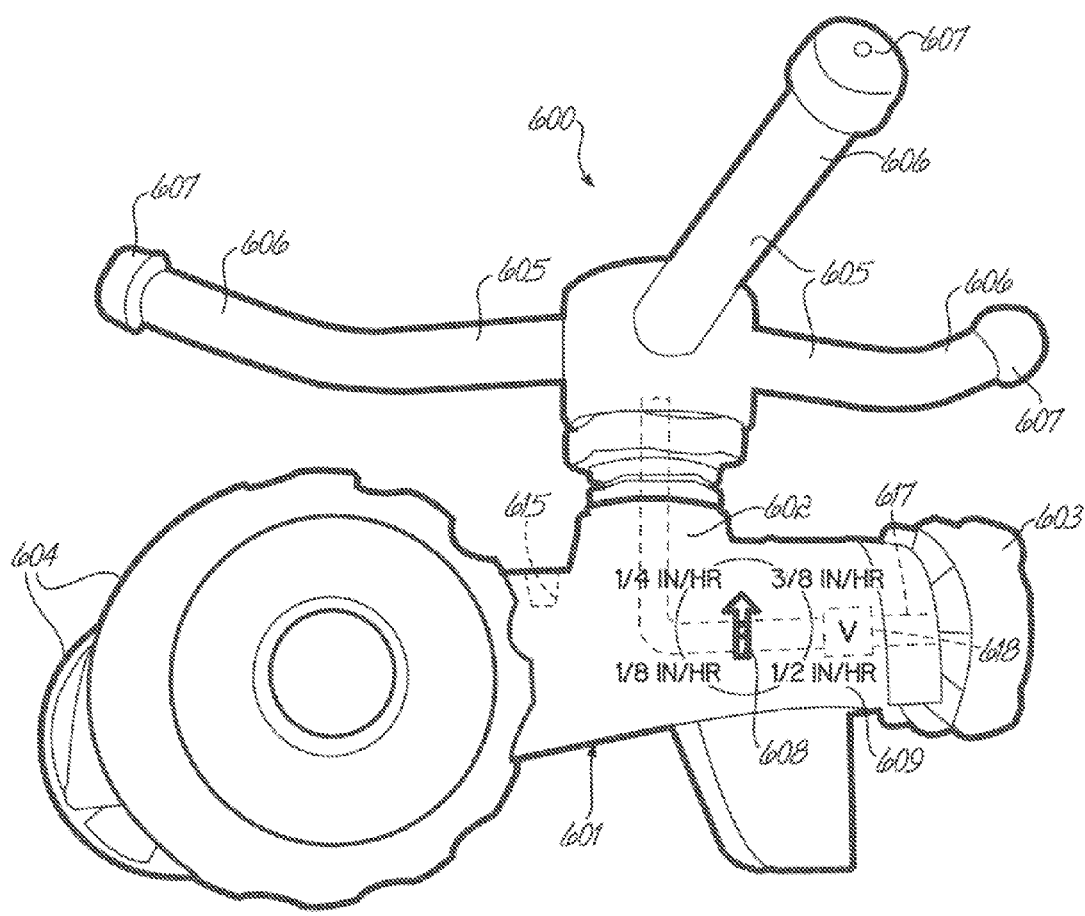
FIG. 9 is a schematic view of another embodiment of a water flow metering device used in conjunction with a whirling sprinkler.

In another embodiment of the water flow metering device 600 provided in FIG. 9, the flow metering device is incorporated in a single-pattern sprinkler such as a whirling sprinkler having a device body 601. The device body 601 has a base 602 with a water inlet 603 and wheels 604 for moving the device body 601. The water inlet 603 is in fluid communication with three discharge arms 605 having angled ends 606 with flow outlets 607. As water travels through the discharge arms 605, the movement of the water through the angled ends 606 automatically drives rotation of the three discharge arms 605 to cover a full 360 degrees of spray. A pressure control valve 618 is disposed in an internal passage 617 between the water inlet 603 and the discharge arms 605, and the pressure control valve 618 limits the pressure of water entering the water flow metering device 600 to a predetermined pressure.

In some embodiments, the water flow metering device 600 further includes a flow selector 608 which in the illustrated embodiment is a switch 608 that limits the flow of water through the device body 601. The switch 608 may control the pressure control valve 618 or may alternatively control a separate valve within the device body 601 to limit the flow of water through the device body 601. In other embodiments, the water flow metering device 600 does not include the flow selector 608. The flow selector 608 may include a label 609 indicating the amount of water flow the water flow metering device 600 will deliver at different settings of the flow selector 608. In embodiments of the water flow metering device 600 without a flow selector 608, a label 609 will still be provided on the water flow metering device 600 to indicate the amount of water depth per hour delivered by the water flow metering device 600 according to the size of the flow outlets 607 and the incoming pressure set by the pressure control valve 618.

The water flow metering device 600 may also be combined with a timer mechanism 200 and/or an accumulator device 615 in a manner consistent with what was previously described. A pressure transducer 1000 or other volumetric flow measurement device may be used instead of the pressure control valve 618, with the flow selector 608 acting as the pattern selector 1034 in carrying out the water control process described above and the system configuration illustrated in FIG. 4A, the controller 1020 and depth selector 1032 being integrated into the device 600 as previously described.

Figure 10:
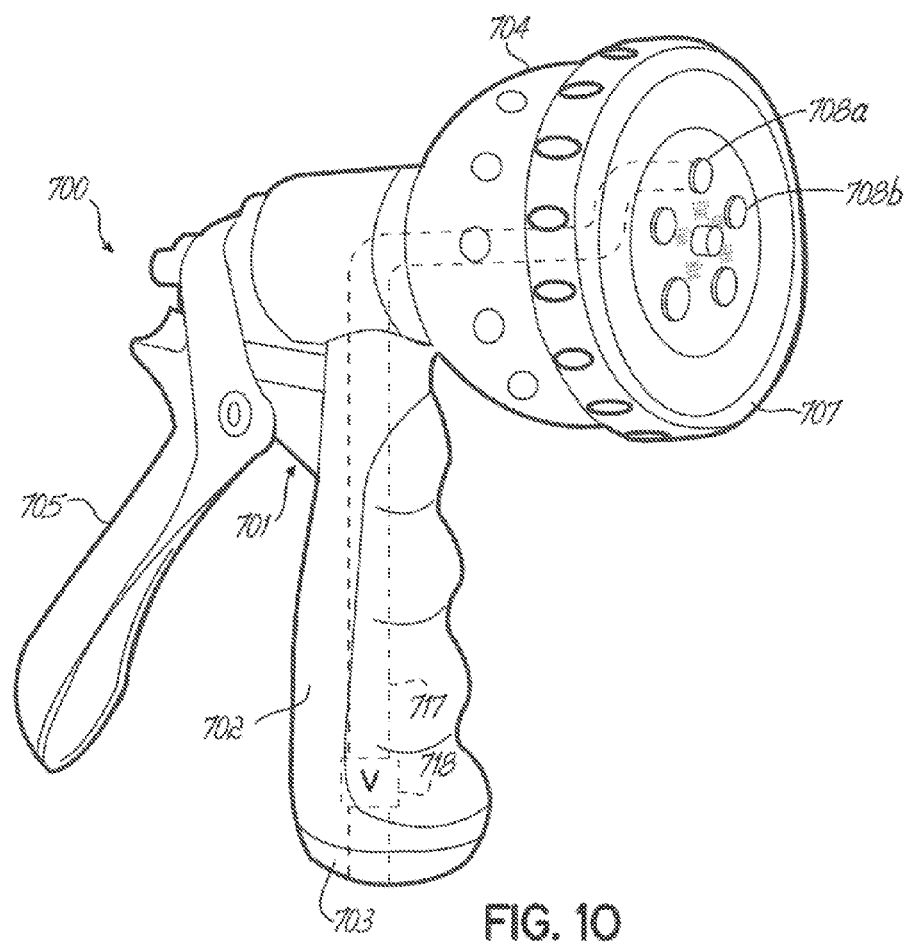
FIG. 10 is a schematic view of another embodiment of a water flow metering device used in conjunction with a water pistol.
Figure 10A:
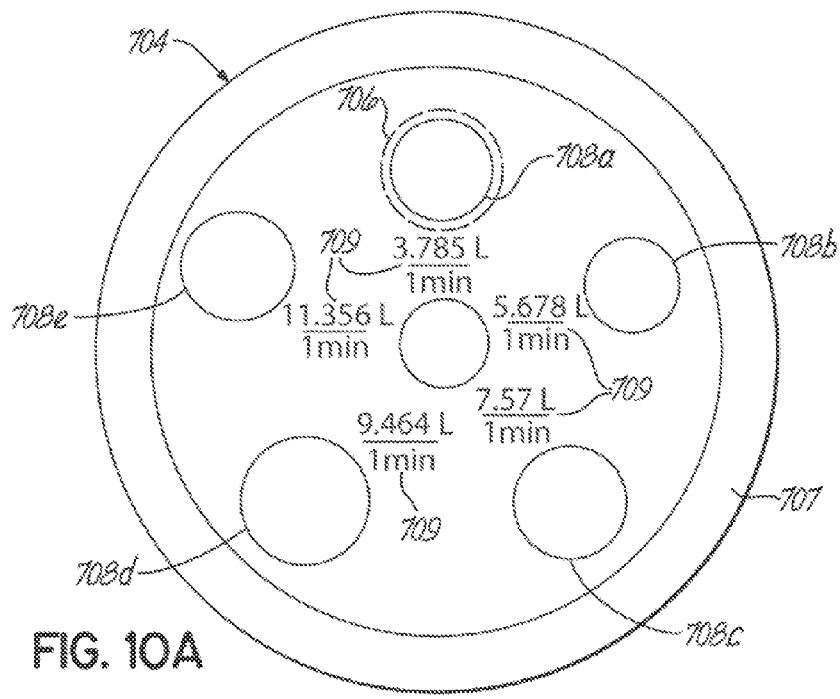
FIG. 10A is a front view of the label on the nozzle of the water pistol of FIG. 10.

In another embodiment of the water flow metering device 700 provided in FIGS. 10 and 10A, the flow metering device is in the form of a water pistol having a device body 701. The device body 701 has a handle 702 with a water inlet 703 and a discharge head 704 coupled to the handle 702 opposite the water inlet 703. A pressure control valve 718 is disposed in an internal passage 717 between the water inlet 703 and the discharge head 704, and the pressure control valve 718 limits the pressure of water entering the water flow metering device 700 to a predetermined pressure. The device body 701 also includes a trigger 705 which may be compressed against the handle 702 to open the pressure control valve. The discharge head 704 includes a flow orifice 706 and a flow pattern selector 707 which in the illustrated embodiment is a dial 707 with a plurality of flow outlets 708. The flow outlets 708 may be rotated into fluid communication with the flow orifice 706 to provide varying metered levels of flow from the water flow metering device 700.

The dial 707 includes a label 709 (FIG. 10A) which shows the amount of water flow the water flow metering device 700 will deliver at different settings of the flow pattern selector 707. Unlike the previous embodiments, the label 709 shows flow rate amounts in liters per minute, which is useful for comparing the output of water of the water flow metering device 700 to the output of alternative watering devices such as watering cans. As shown by the label 709 on the illustrated dial 707, flow outlet 708*a* meters water flow to discharge at about a rate of 3.785 liters per minute. Flow outlet 708*b* meters water flow to spray at about a rate of 5.678 liters per minute. Flow outlet 708*c* meters water flow to discharge at about a rate of 7.57 liters per minute. Flow outlet 708*d* meters water flow to spray at about a rate of 9.464 liters per minute. Flow outlet 708*e* meters water flow to discharge at about a rate of 11.356 liters per minute. If an adjustable pressure control valve is used, the label may include multiple values to reflect different flow rates for different pressures, or the indicia may be replaceable to accommodate different pressure settings.

Figure 11:
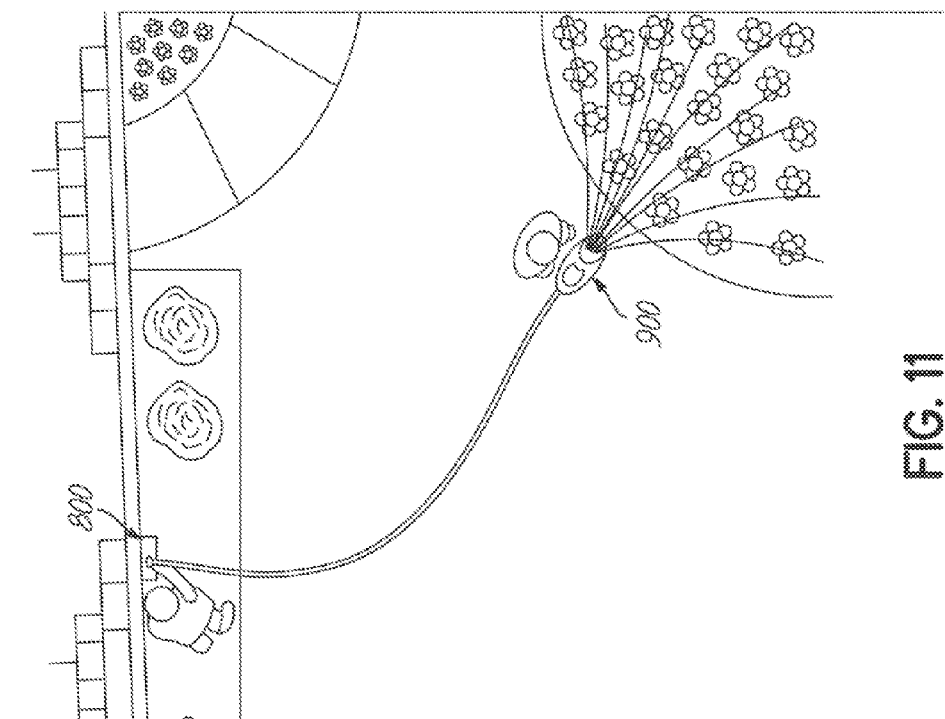
FIG. 11 is a top view of a lawn using a sprinkler with a water flow metering device in accordance with another embodiment of the present invention.
Figure 11C:
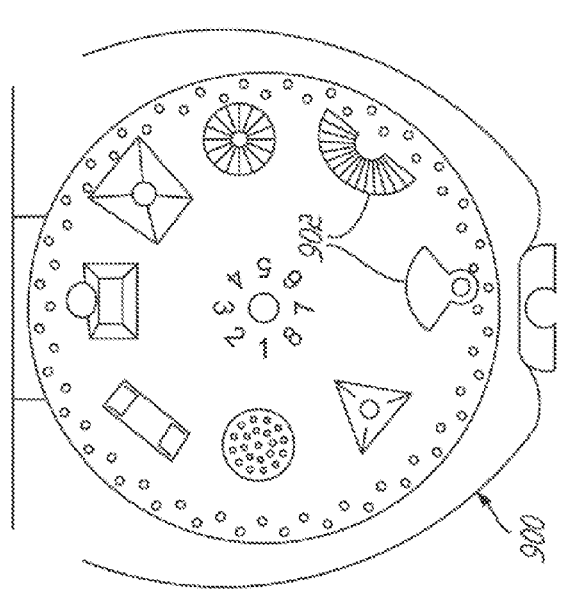
FIG. 11C is a partial top view of the sprinkler of FIG. 11.
Figure 11B:
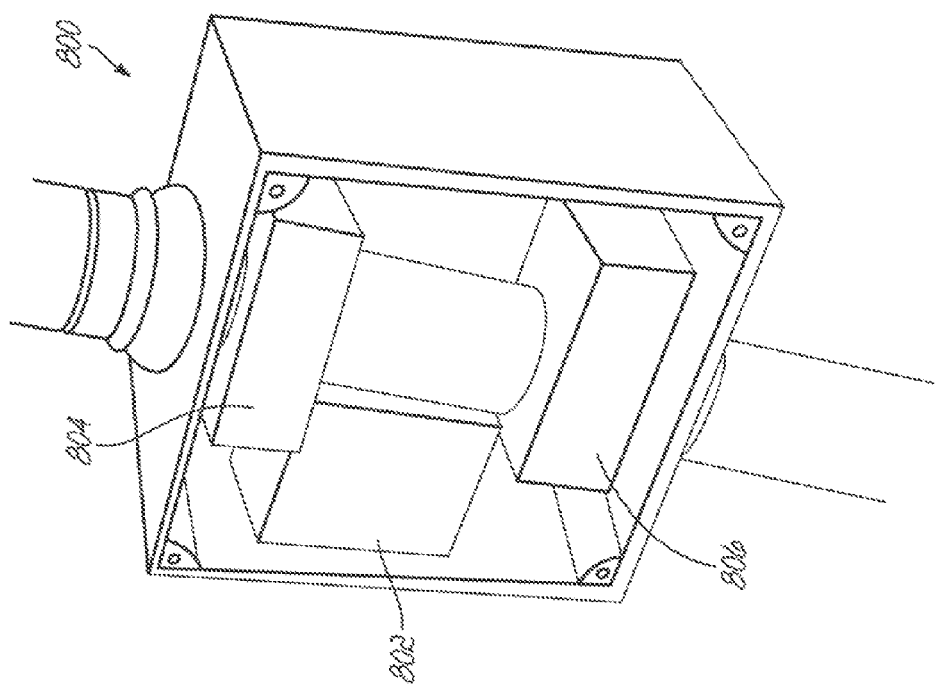
FIG. 11B is a perspective partially disassembled view of the water flow metering device of FIG. 11A.
Figure 11A:
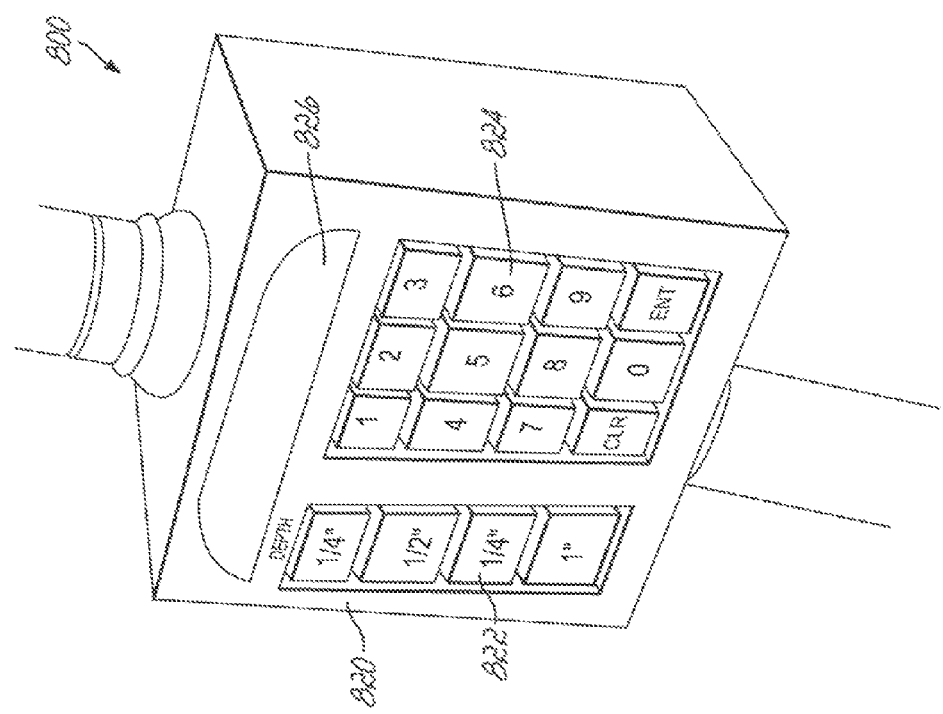
FIG. 11A is a perspective view of the water flow metering device of FIG. 11.

As shown in FIGS. 11-11C, a flow meter device 800 may also be disposed distant from a spray device 900. The spray device 900 may be any of the devices above or any other spray or sprinkler device for distributing water over an area, and may features for adjusting between a plurality of spray patterns as shown (FIG. 11C). The flow meter device includes an input panel 820, a controller 802, a volumetric flow measurement device 804, and a shut-off valve 806. The input panel 820, shown in FIG. 11A, includes a set of depth input buttons 822, a keypad 824, and a display 826.

The flow meter device 800 works generally according to the schematic illustrated as FIG. 4A. The controller 802 takes input in the form of a desired depth of water to be distributed from the depth input buttons 822. The keypad 824 acts as a flow selector, using numbered patterns as shown by the indicia 902 on the spray device 900 as shown in FIG. 11C. In one embodiment, the controller 802 communicates the selected pattern to the spray device 900 in order to determine the actual spray pattern in use.

In an alternative embodiment, the actual spray pattern is selected by another means on or near the spray device 900, and no electrical control between the meter device 800 and spray device 900 exists. In this alternative, the user may still input the chosen spray pattern into the keypad 824 in order to give the controller 802 data by which to calculate a run time for the water as described above. If this alternative is used, it will be recognized that many known flow geometries and sprinkler output configurations may be pre-programmed into the controller 802, such that a number of different sprinkler devices may be connected to the flow meter device 800. The specific device and device settings may then be input using the keypad 824, possibly with aid or confirmation from the display 826, in order to configure the controller to calculate depth times on the basis of the attached sprinkler head or heads.

In some cases, there may be multiple parameters to be considered. For example, a sprinkler head may have a plurality of nozzle geometries and also a variable angle of distribution, effectively giving the system both a pattern selector 1034 and an angle selector 1036 as described above. A controller 802 can accommodate a plurality of settings by means of the keypad 824 and display 826, prompting the user to input any settings information necessary to calculate the appropriate duration to run the device 900. Providing that the memory associated with the controller 802 is equipped with data or equations for calculating a run time based on the settings, any reasonable number of additional settings and parameters can be accommodated for by programming controller 802 in a manner known to one in the art.

In some embodiments, the controller 802 may be capable of storing sprinkler head settings for future watering events, such that the use of the depth input buttons 822 may be all that is necessary to meter additional water using the same settings as previously. If desired, a single button-press may be all that is necessary to reactivate the device.

In another embodiment, a pressure transducer or other volumetric measurement device may accompany a controller and display even in the absence of a timer or shut-off valve. Here the controller may use an ongoing signal representing the volumetric flow of water, as well as the known geometry of the water distribution pattern, in order to display a depth per unit time to the user. As in earlier embodiments discussed in the absence of a timer, a user desiring to distribute a set depth of water over an area can use the display to accurately plan the depth of water to distribute by any method known in the art.

The controller may receive input representing a variety of pattern configurations or parameters as known in the art and further described above, such as directly through communication with flow or angle selectors, or indirectly through the use of a keypad or other user input device, and may vary the depth per time display value in accordance with these different parameters as further described above. In one embodiment, an indicia ring mounted above or on angle-setting brackets, similar to those described above with respect to FIGS. 5 and 5B, may display a numerical code at different points along its circumference corresponding to different angle settings. The user could input the code most accurately reflecting the chosen bracket settings, allowing the controller to determine and display depth per time on the basis of the input settings. In one embodiment, numbers on the indicia could represent a coefficient that the controller multiplies or divides by to determine a depth per time, or any other numerical value used in a formula associated with the controller.

Figure 12:
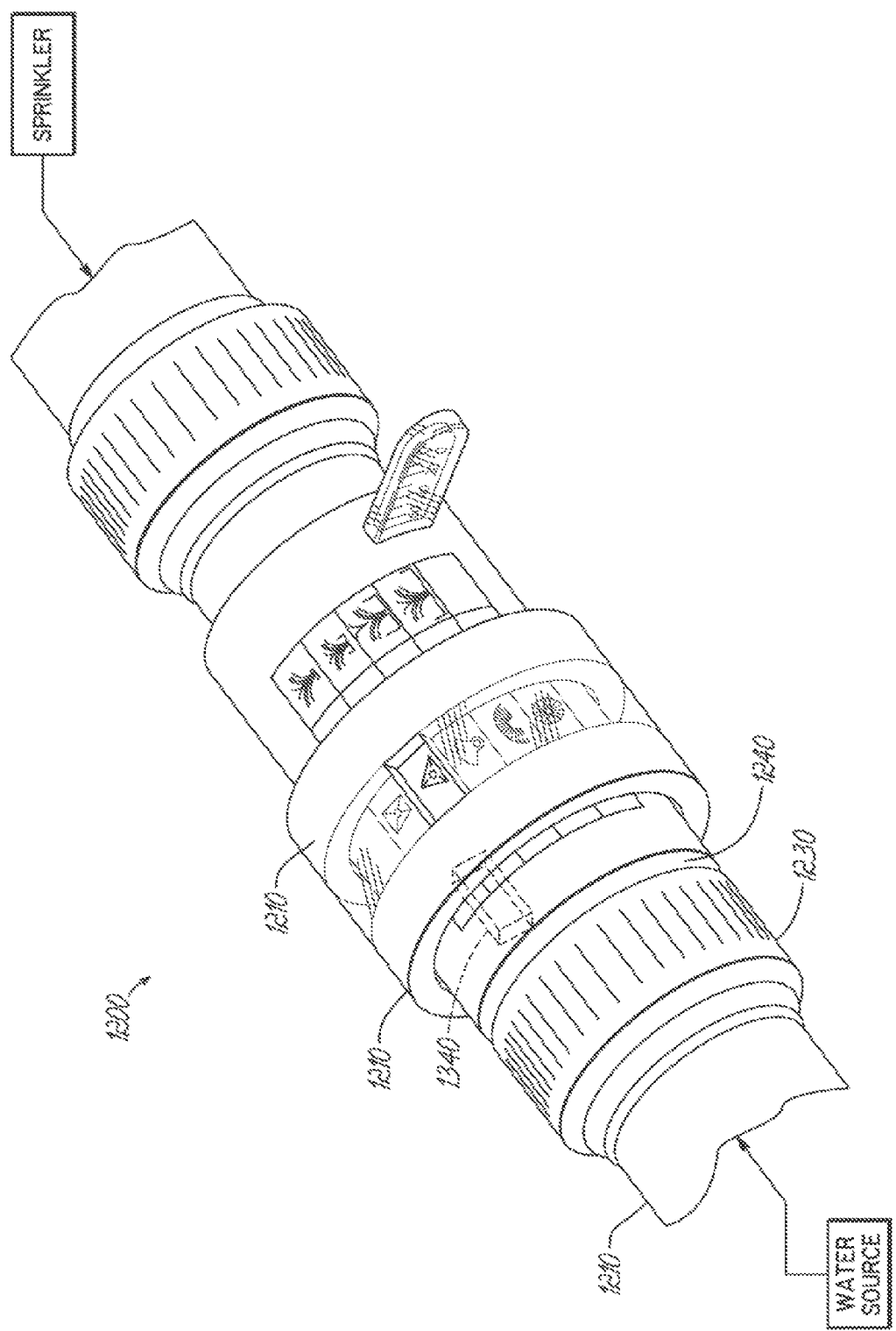
FIG. 12 is a schematic view of a device for measuring water flow and identifying depth over time information in accordance with another embodiment of the present invention.

FIG. 12 illustrates a device 1200 configured to connect between two hose sections in order to measure the flow of water therethrough. As shown, the device 1200 is positioned between a first hose section 1210 and a second hose section 1220. The first hose section 1210 has an end connector 1230 that is connected to an inlet connector 1240 of the device 1200. The second hose section 1220 has an end connector 1250 that is connected to an outlet connector 1260 of the device 1200. End connectors 1230, 1250 and inlet/outlet connectors 1240, 1260 may be the type of connectors typically used in a water hose environment, such as corresponding male and female threaded connectors. The device 1200 has a generally cylindrical body 1270.

A passageway (not shown) extends through the device 1200 so that water can flow therethrough from the first hose section 1210 to the second hose section 1220. The first hose section 1210 is connected to a water source 1280 and the second hose section 1220 is connected to a sprinkler 1290 having a particular distribution pattern.

The device 1200 includes a pressure gauge 1300 for measuring the pressure of water flowing through it, and for providing an indication of the pressure value to a user, such as at 1310.

The device 1200 also includes an information chart 1320 that provides indicia relating to pressure values, sprinkler distribution patterns, and depth distribution of water over time information. Pressure values may be provided along the axial direction of the information chart 1320 (along the axis of flow of water). Sprinkler distribution patters and depth distribution of water over time information may be arranged circumferentially on the information chart 1320. A chart interpretation tool 1330 is provided and is moveable with respect to the information chart 1320. Particularly, the chart interpretation tool is rotatable around the device 1200 as well as being moveable along the axial direction thereof. The chart interpretation tool 1330 includes a first window 1340 and a second window 1350. A user positions the chart interpretation tool 1330 to an axial position on the information chart 1320 corresponding to the pressure value indicated at 1310 by the pressure gauge 1300. Maintaining the axial position, the user then positions the chart interpretation tool 1330 so the first window 1340 aligns with a distribution pattern corresponding to the distribution pattern of the sprinkler 1290 with which the device 1200 is used. The second window 1350, then, will reveal depth distribution of water over time information for the given pressure and distribution pattern. For example, a given pressure and distribution pattern may be associated with a depth distribution of water over time of one-half inch per hour.

While the present invention has been illustrated by a description of various preferred embodiments and while these embodiments have been described in some detail, it is not the intention of the applicant to restrict or in any way limit the scope of the appended claims to such detail. Additional advantages and modifications will readily appear to those skilled in the art. The various features of the invention may be used alone or in numerous combinations depending on the needs and the preferences of the user.

What is claimed is:

1. A water flow metering system comprising:
a device body comprising a water passage, the water passage comprising a water inlet and a water outlet;
a shut-off valve disposed within the water passage, the shut-off valve operable to block water flow between the water inlet and water outlet when closed;
a controller operable to open and close the shut-off valve;
a measuring device disposed within the water passage operable to communicate a measurement of water flowing through the passage to the controller;
a flow pattern selection element having a plurality of selectable flow patterns for selection by a user, the flow patterns corresponding to a plurality of flow outlets that are associated with a water distribution device that is to be coupled with the water passage of the system, the flow pattern selection element operable for communicating a selected flow pattern setting to the controller;
a depth selection device operable to receive input from a user corresponding to a depth value of water to distribute through a water distribution device, the depth selection device operable to communicate the depth value to the controller;
the controller configured to calculate a watering duration for the shut-off valve to remain open, the watering duration based at least on the measurement communicated from the measuring device, the selected flow pattern setting, and the depth value communicated from the depth selection device, and further configured to close the shut-off valve after the calculated duration.

2. The water flow metering system of claim 1, further comprising:
an accumulator device operable to communicate amounts of natural rainfall to the controller.

3. The water flow metering system of claim 1, wherein the water flow metering system is configured for use with a wand-style sprinkler, and the flow pattern selection element flow patterns correspond to a plurality of flow outlets on a rotatable dial that are sized for differing spray volumes per hour.

4. The water flow metering system of claim 1, wherein the water flow metering system is configured for use with a water pistol, and the flow pattern selection element flow patterns correspond to a plurality of flow outlets on a rotatable dial having a plurality of flow outlets sized for differing spray volumes per hour.

5. A water flow metering device for use as a handheld or ground-based sprinkler, comprising:
a device body including a water inlet;
a water distribution head in fluid communication with the device body;
a pressure control valve disposed between the water inlet and the water distribution head, the pressure control valve operative to limit the pressure of the water entering the device body to a predetermined pressure; and
a flow pattern selector coupled to the water distribution head and operable to meter the amount of water sprayed onto the surrounding area, the flow pattern selector including indicia providing flowrate information to an operator in inches per hour based on the predetermined pressure.

6. The water flow metering device of claim 5, further comprising:
a timing mechanism including a timer configured to positively close the pressure control valve after a set period of time.

7. The water flow metering device of claim 5, wherein the timing mechanism further includes an accumulator device coupled with the device body, the accumulator device determining natural amounts of rainfall so that the timer may close the pressure control valve more quickly when more natural rainfall has occurred.

8. The water flow metering device of claim 5, wherein the pressure control valve is adjustable such that the predetermined pressure to which water entering the device body is limited can be changed to any one of a plurality of different pressures.

9. The water flow metering device of claim 5, wherein the indicia provides flowrate information in inches per hour for a plurality of the different pressures to which the control valve can be adjusted.

10. A water flow metering system comprising:
- a device body comprising a water passage, the water passage comprising a water inlet and a water outlet;
- a shut-off valve disposed within the water passage, the shut-off valve operable to block water flow between the water inlet and water outlet when closed;
- a controller operable to open and close the shut-off valve;
- a measuring device disposed within the water passage operable to communicate a measurement of water flowing through the passage to the controller;
- a flow angle selection element having a plurality of selectable flow angles for selection by a user, the flow angles corresponding to an angle setting associated with a water distribution device that is to be coupled with the water passage of the system, the flow angle selection element operable for communicating a selected flow pattern setting to the controller;
- a depth selection device operable to receive input from a user corresponding to a depth value of water to distribute through a water distribution device, the depth selection device operable to communicate the depth value to the controller;
- the controller configured to calculate a watering duration for the shut-off valve to remain open, the watering duration based at least on the measurement communicated from the measuring device, the selected flow angle, and the depth value communicated from the depth selection device, and further configured to close the shut-off valve after the calculated duration.

11. The water flow metering system of claim 10, wherein the water flow metering system is configured for use with a rotating gear drive sprinkler, and the flow angle selection element includes a pair of limiting brackets that limit the rotation of the gear drive sprinkler for modifying the spray volume per hour.

12. The water flow metering system of claim 10, wherein the water flow metering system is configured for use with an impulse head sprinkler, and the flow angle selection element includes a member that is operative to limit the overall rotation of the impulse head sprinkler in one spray cycle for modifying the spray volume per hour.

13. The water flow metering system of claim 10, wherein the water flow metering system is configured for use with an elongate oscillating sprinkler, and the flow angle selection element includes a switch that limits the angle of oscillation of the oscillating sprinkler for modifying the spray volume per hour.

\* \* \* \* \*